J. F. McCANN.
KETTLE STRAINER.
APPLICATION FILED NOV. 10, 1909.
984,954.
Patented Feb. 21, 1911.
2 SHEETS—SHEET 1.
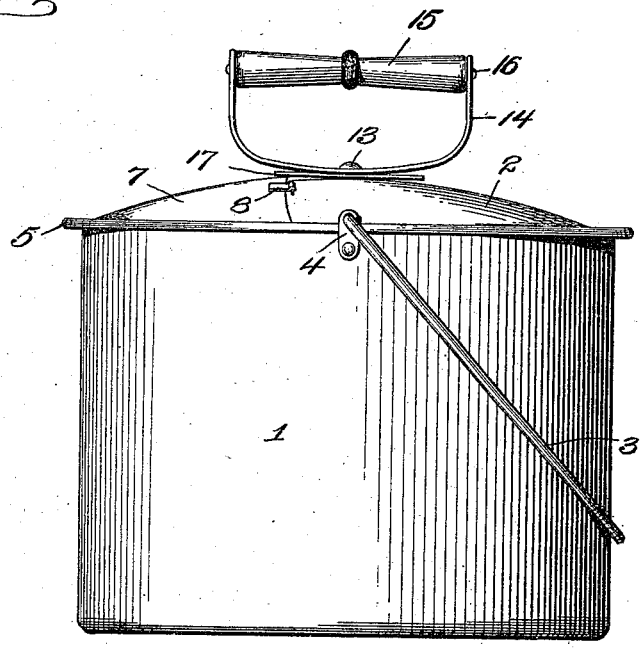
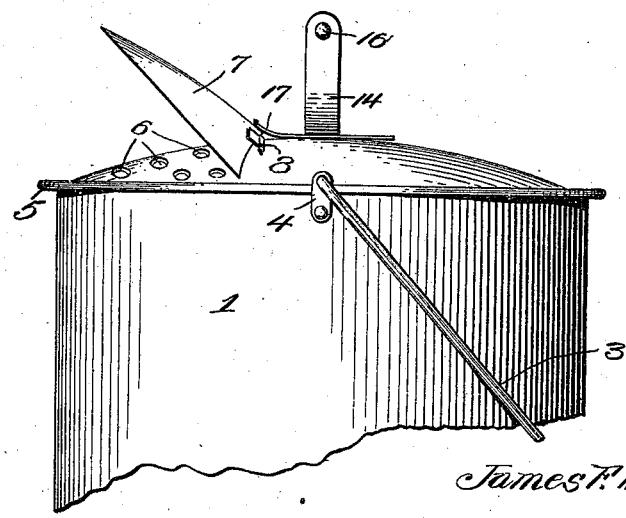

J. F. McCANN.
KETTLE STRAINER.
APPLICATION FILED NOV. 10, 1909.
984,954.
Patented Feb. 21, 1911.
2 SHEETS—SHEET 2.
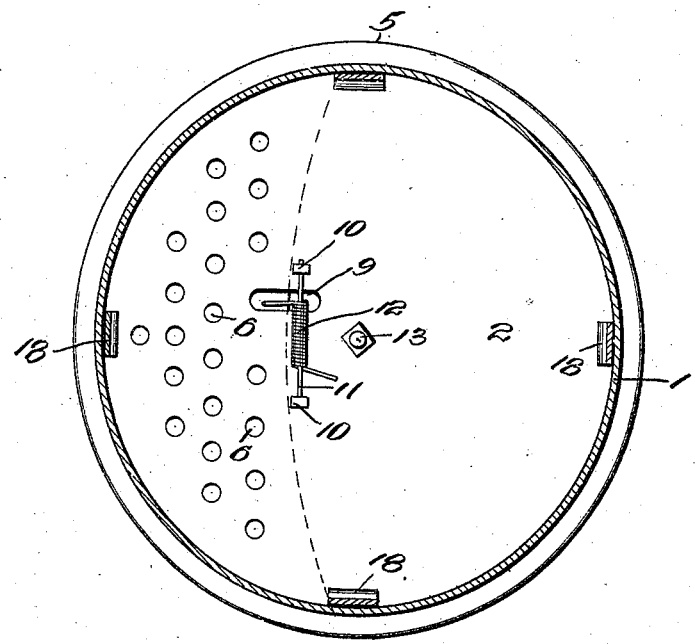
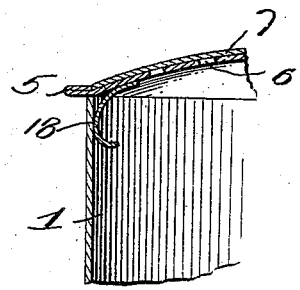
Witnesses
G. F. Folson.
Harry M. Pest.
Inventor
James F. McCann.
By Victor J. Evans
Attorney
THE NORRIS PETERS CO., WASHINGTON, D. C.

UNITED STATES PATENT OFFICE.

JAMES F. McCANN, OF MINNEAPOLIS, MINNESOTA.

KETTLE-STRAINER.

984,954.  Specification of Letters Patent.  Patented Feb. 21, 1911.

Application filed November 10, 1909. Serial No. 527,287.

*To all whom it may concern:*

Be it known that I, JAMES F. McCANN, a citizen of the United States, residing at Minneapolis, in the county of Hennepin and State of Minnesota, have invented new and useful Improvements in Kettle-Strainers, of which the following is a specification.

This invention relates to improvements in domestic cooking vessels and more particularly to devices of this class provided with strainer lids.

One object of the invention is to provide a device of this character which is cheaply constructed and simple in operation.

Another object is to provide such a device that on tilting the vessel and turning the handle of the lid a series of perforations in the lid will be uncovered to strain the contents.

Still another object is to provide a cooking vessel having a lid provided with a strainer, a cover for the strainer and a rotatable means for controlling the opening and closing of said cover.

With these and other objects in view the result may be obtained from the construction, as shown in the drawings, in which:—

Figure 1 is a side elevation of a vessel, showing my device applied, the strainer being closed. Fig. 2 is a similar view partly broken away, showing the strainer device in an open position. Fig. 3 is a horizontal section through the vessel showing the means of attaching the lid to the vessel and the closing means for the strainer lid, and Fig. 4 is a vertical fragmentary section through the strainer portion of the lid.

In the drawings 1 represents the vessel, 2 the lid and 3 the ordinary handle pivoted in the ears 4. The lid 2 has its outer edge bent on itself to form a reinforcing lip 5. In the face of the lid near one edge thereof is provided a series of perforations 6 adapted to be closed by a swinging cover 7 hinged at 8. Near the center of the lid is an elongated slot 9.

Arranged on either side of the slot 9 is a perforated lug 10 adapted to receive the shaft or pin 11 around which is disposed a coil spring 12. One end of the spring 12 bears against the under face of the lid 1 and the opposite end projects through the slot 9 and engages the under face of the swinging cover 7. The office of this spring is to tend to force the cover 7 upward.

Pivoted at the center of the lid and the upper face thereof by means of a rivet 13 is a U-shaped member 14 across whose arms is arranged a handle 15 secured at its ends by any suitable means as by rivets 16. Disposed between the member 14 and the top of the lid 2, is a flat spring 17 provided with a perforation through which passes the rivet 13. One end of the spring 17 projects a slight distance over the inner end of the swinging cover 7. The member 14, when grasped by the handle 15 and turned to the position shown in Fig. 1, will engage with the spring 17 and prevent its upward movement. When the member 14 is turned to the position, represented in Fig. 2, the ends of the spring 17 are uncovered and the spring 12 exerting an upward pressure against the cover 7 will force the lid 7 open against the tension of the spring 17. The vessel is then lifted by the handle 3 in one hand and the handle 15 grasped by the other hand whereby it may be tilted and the contents strained through the perforations 6.

To close the perforations the handle 15 and the member 14 are turned into the position as shown in Fig. 1 when it will engage with the spring 17 forcing the lid 7 downward.

Secured to the under face and near the edge of the lid 2 is a series of friction spring members 18 adapted to engage with their free ends against the inner face of the receptacle and hold the lid 2 thereto.

From the foregoing it will be readily seen that I have provided a simple device for straining the contents of a cooking vessel and one which is provided with means to readily uncover the strainer portion of the vessel and consequently is a protection to the hands from the steam arising from said vessel.

Having thus fully described the invention what is claimed as new is:—

A cooking vessel having a lid provided with a series of strainer perforations, a spring-pressed cover for said perforations, and means for holding said cover normally in closed position said holding means comprising a handle a plate engaging with the cover, and secured between the handle and the lid whereby upon rotation of said handle the cover is released and is limited in its opening movement.

In testimony whereof I affix my signature in presence of two witnesses.

JAMES F. McCANN.

Witnesses:
MARTIN A. SANDBERG,
H. E. COFFIN.